(12) United States Patent
Bodin et al.

(10) Patent No.: US 7,059,657 B2
(45) Date of Patent: Jun. 13, 2006

(54) VEHICLE DOOR AND A METHOD OF MANUFACTURING SUCH A DOOR

(75) Inventors: Hans Bodin, Sodra Sunderbyn (SE); Martin Jonsson, Lulea (SE); Jan Krispinsson, Lulea (SE); Lars Wikstrom, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 3 days.

(21) Appl. No.: 10/523,040

(22) PCT Filed: Aug. 7, 2003

(86) PCT No.: PCT/SE03/01257

§ 371 (c)(1),
(2), (4) Date: Feb. 2, 2005

(87) PCT Pub. No.: WO2004/014681

PCT Pub. Date: Feb. 19, 2004

(65) Prior Publication Data

US 2005/0264028 A1  Dec. 1, 2005

(30) Foreign Application Priority Data

Aug. 8, 2002 (SE) .................................. 0202380

(51) Int. Cl.
*B60J 5/04* (2006.01)
(52) U.S. Cl. ............................ 296/146.6; 296/146.2; 296/146.5; 296/146.7

(58) Field of Classification Search ............... 296/146, 296/2, 146.5, 146.6, 146.7
See application file for complete search history.

(56) References Cited

U.S. PATENT DOCUMENTS

| | | | |
|---|---|---|---|
| 4,800,638 A * | 1/1989 | Herringshaw et al. ...... 29/407.1 |
| 5,033,236 A * | 7/1991 | Szerdahelyi et al. .......... 49/502 |
| 6,205,714 B1 | 3/2001 | Staser et al. |
| 6,302,472 B1 * | 10/2001 | Rahmstorf et al. ...... 296/146.5 |
| 6,428,080 B1 * | 8/2002 | Ochoa ..................... 296/146.6 |
| 6,561,567 B1 * | 5/2003 | Mrozowski et al. ..... 296/146.5 |
| 2002/0043817 A1 | 4/2002 | Gehringhoff et al. |

FOREIGN PATENT DOCUMENTS

SE 518503 10/2002

* cited by examiner

*Primary Examiner*—Dennis H. Pedder
(74) *Attorney, Agent, or Firm*—Mark P. Stone (57) ABSTRACT

A supporting frame 10 of a door with an integrated side impact guard beam 22 is made of high strength steel. The outer panel 28 of the door will be close to the side impact guard beam. All the interior units of the door, such as lock and window structure 34–37 with window frame 37, are mounted on a beam structure 30. The beam structure is then mounted on the frame 10 so that the window structure will be between the frame 10 and the beam structure 30.

20 Claims, 7 Drawing Sheets

VEHICLE DOOR AND A METHOD OF MANUFACTURING SUCH A DOOR

TECHNICAL FIELD OF THE INVENTION

This invention relates to a vehicle door and a method of manufacturing such a door.

TECHNICAL BACKGROUND OF THE INVENTION AND BRIEF DESCRIPTION OF PRIOR ART

Modern vehicle doors usually comprise a supporting deep drawn so called inner panel with a thickness that is the thickness of the door. An outer panel is bent around the edges of the inner panel and secured with cement. The inner panel is deep drawn and it can therefore not be made of high strength steel. A so called waist rail under the window is welded to the inner panel and it can be located inside of or outside of the window. A side impact guard beam of steel with considerably higher strength than the steel of the inner panel is also welded to the inner panel and located close to the outer panel. A flat trim is fastened to the inner panel. The end sides of the door consist solely of the end sides of the inner panel and the inner panel side adjacent the vehicle interior has only relatively small openings, which makes the mounting of the inner details of the door difficult.

OBJECT OF INVENTION AND BRIEF DESCRIPTION OF THE INVENTION

It is an object of the invention to provide for a vehicle door that is light in weight and strong and which can be made at a low cost and makes the mounting of the elements of the door simple such as the mounting of the window structure of the door. This is achieved principally by a vehicle door that comprises:

a supporting frame of high strength steel with side impact guard beam, an outer panel fastened on the frame so that the side impact guard beam will be close to the frame, a beam structure releasably mounted on the frame, and an inner panel fastened on the beam structure, the window structure of the door being mounted on the releasable beam structure and located between the frame and the beam structure.

The method according to the invention comprises that a supporting frame of high strength steel including a side impact guard beam is made, an outer panel is fastened on the frame so that the side impact guard beam will be close to the outer panel, and a beam structure is mounted on the frame, a window structure being mounted on the beam structure before the mounting of the beam structure so that the window structure will be located between the frame and the beam structure when the beam structure is in place.

The supporting frame can suitably be made by hot-stamping a blank of hardenable steel sheet and hardening the thus formed frame with integrated side impact guard beam while it is in the forming tools. When assembling the door, the outer panel is then fastened to the supporting frame of the door so that the side impact guard beam of the frame will be close to the outer panel.

In this way, a very high strength of the frame can be achieved and the inner panel need not have a supporting function and it can therefore be made for example of plastics. This inner panel can be made deep to cover a major part of the thickness (width) of the door instead of the supporting element extending over practically the entire thickness of the door. The supporting frame may have a thickness that is less than half the thickness of the door. The forming of the frame is facilitated if the frame is thin relative to the thickness of the entire door, and a frame can therefore be made that has very high strength steel. In a conventionally built door with a supporting part that is formed deeper, one must use steel with a lower strength. Since the frame can be relatively thin, it can alternatively be cold formed in high-strength cold forming steel, but as high strength can not be reached as in the press hardening process. In the latter process, a yield strength over 800 N/mm$^2$ or even over 1000 N/mm$^2$ can be reached. The elongation to rupture will also be reduced in cold forming as compared to hot forming. A vehicle door according to the invention will be advantageous also if it has a comparatively low strength, for example a yield strength of 350 N/mm$^2$. However, a cold-forming steel with a yield strength of 500 N/mm$^2$ or even higher can probably be used.

Since the entire window structure and also other details such as the door lock can be pre-mounted on a beam structure to form a unit, the door assembly will be simplified and all the elements of the door can be easily accessible if the unit is screwed loose. It is advantageous that also the inner panel be pre-mounted on the beam structure. One will then get a door that consists of a supporting frame with outer panel, onto which a beam structure is mounted on which practically all other elements of the door are pre-mounted.

The invention is defined by the claims.

BRIEF DESCRIPTION OF THE DRAWINGS, WHICH SHOW A PREFERRED EMBODIMENT OF THE INVENTION

DESCRIPTION IN DETAIL OF THE ILLUSTRATED EMBODIMENT

Figure 1:
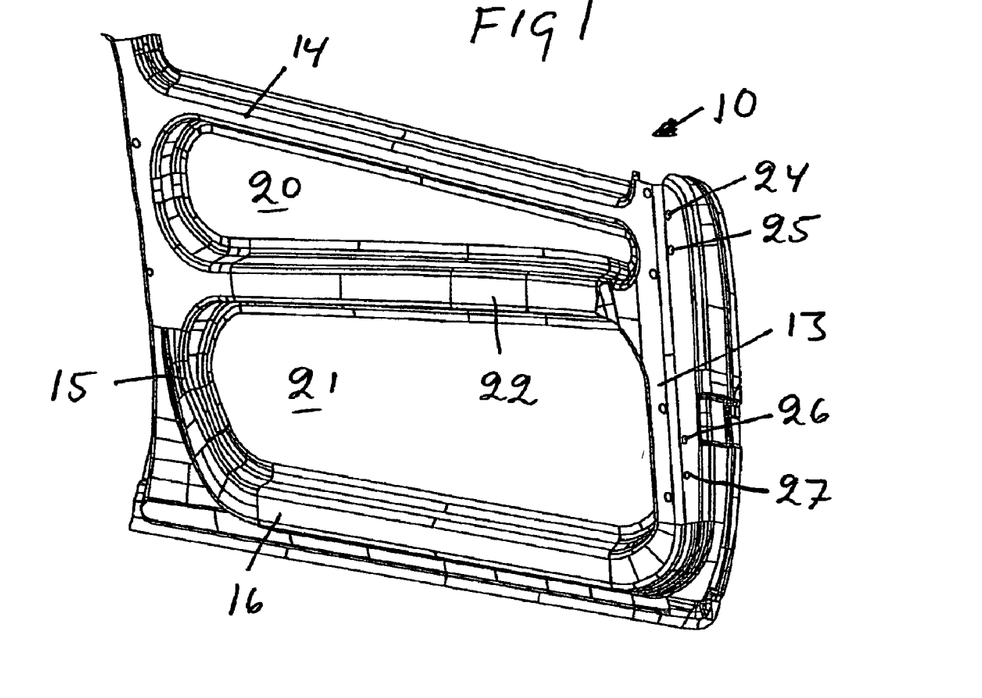
FIG. 1 shows a frame for a left front door. It is shown obliquely from inside/front.
Figure 2:
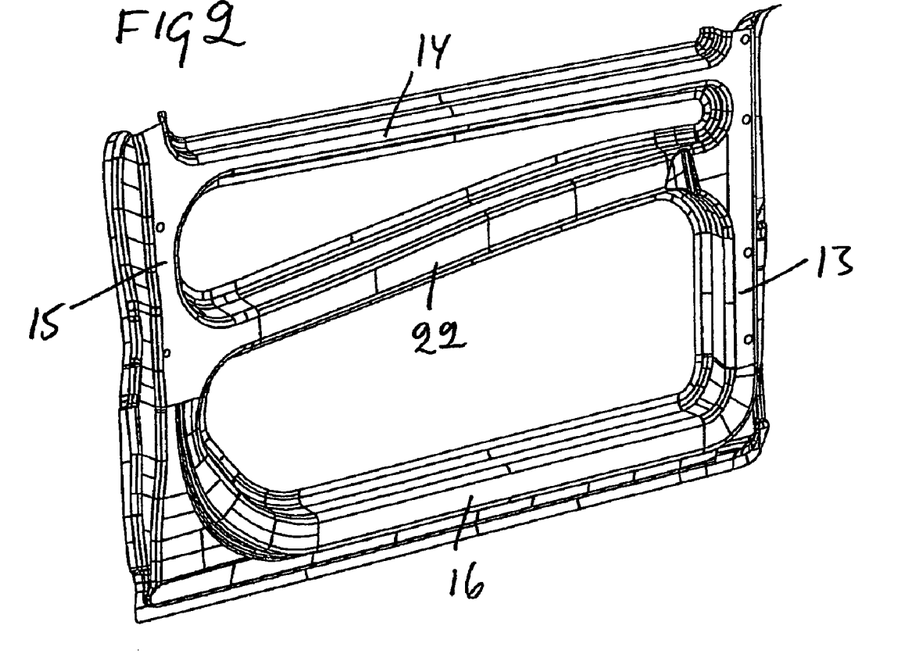
FIG. 2 show thee same door seen from inside/behind.
Figure 3:
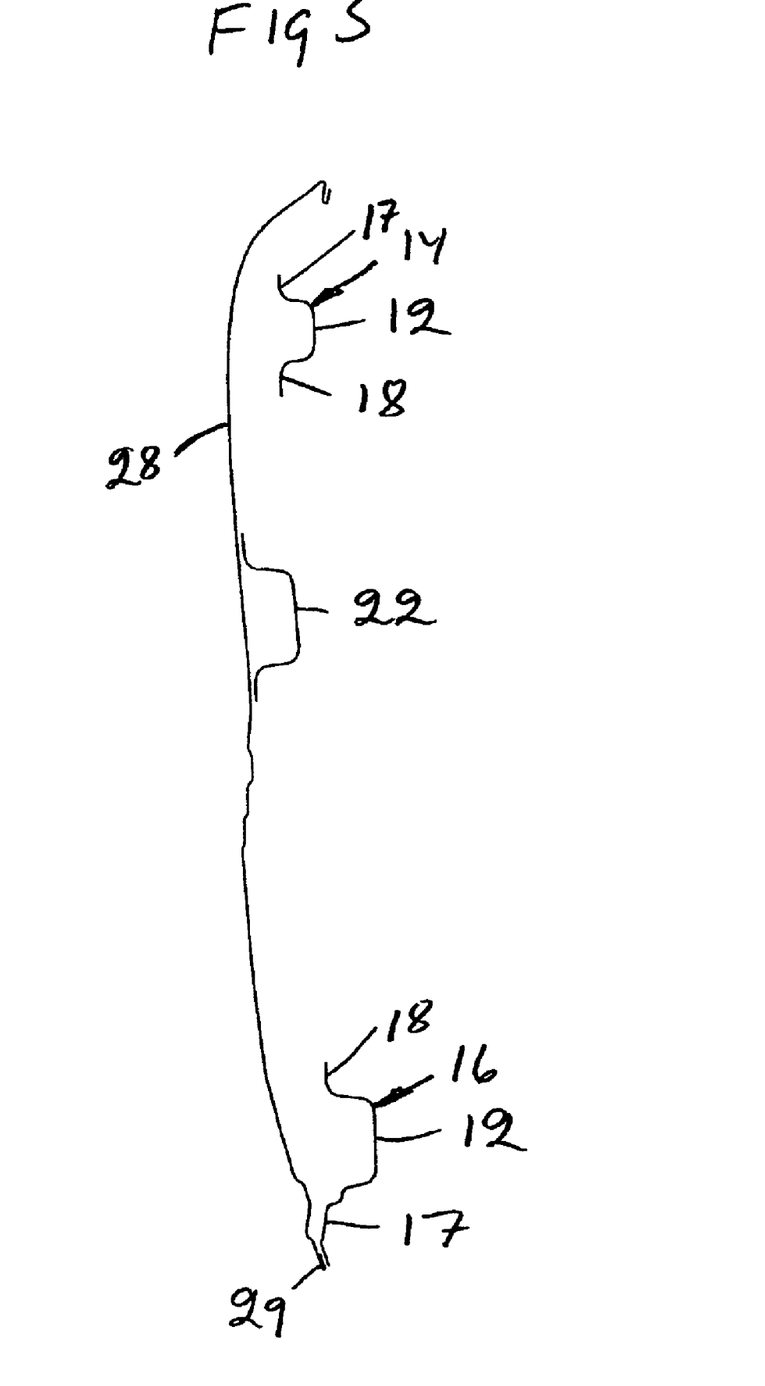
FIG. 3 is a vertical section through the frame shown in FIGS. 1 and 2 and the figure shows also an outer panel.

FIG. 1 shows a frame 10 of a left door of a vehicle, and the frame is seen from the inside and obliquely from front. FIG. 2 shows the same frame seen obliquely from behind. The frame is formed from a flat steel sheet so that it has got an annular hat beam 13–16 with a crown 12 and side flanges 17,18. The outer side flanges 17 have varying width as best can be seen in FIG. 3 so that they will adapt to the outer panel of the door. The hat beam has its crown 12 facing the inside of the vehicle. The hat beam has four straight parts 13,14,15,16 joined by bends. A hole 20,21 is formed in the middle of the annular hat beam and a side impact guard beam 22 extends between the beam portions 13 and 15 and bridges the hole 20,21. The beam 22 can also have an open profile with its crown facing inwards as shown, but it may also have a cover attached to it by spot welding. It may also have another cross section and it may for example have a double-hat profile with its open side facing inwards. Different parts of the hat beam 13–16 may have different transverse profile and may be a double hat at some locations. The hinges of the door are fastened to welded nuts 24,25 and 26,27, respectively.

An outer panel 28 of sheet metal is shown in FIG. 3. It is bent around the outer flange 17 of the hat beam portions 13,15,16 with cement in its folds. In FIG. 3, the bend 29 is shown but, for clarity, it is shown separate and not bent around the side flange 17. The side impact guard beam 22, as well as the other parts of the entire supporting frame 10 will be just adjacent the outer panel, that is, the impact guard will be as far out from the passenger as possible, which is advantageous.

Figure 4:
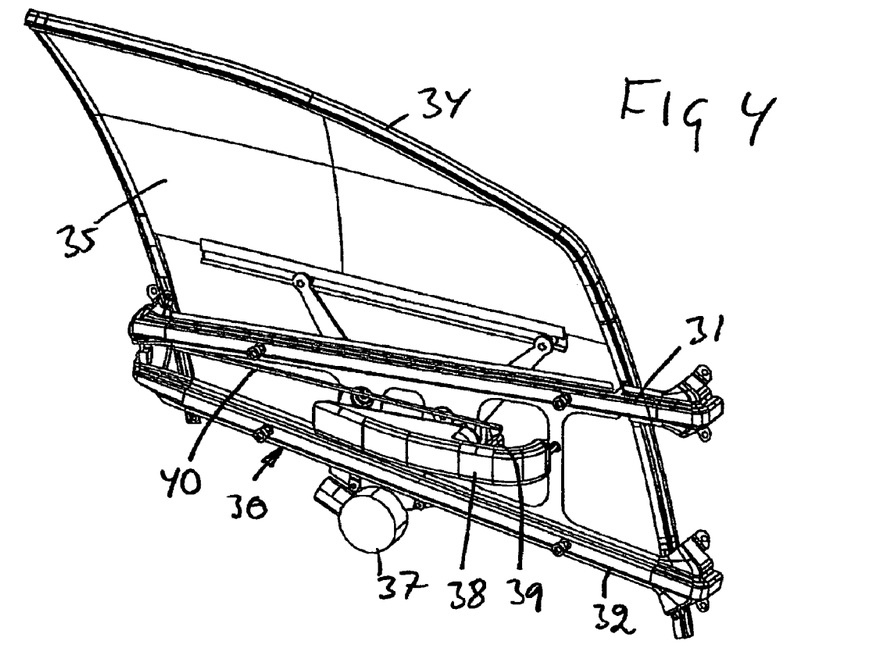
FIG. 4 is a view of a beam structure adapted to be mounted on the frame shown in FIGS. 1–3. The beam structure carries the window structure and the lock and it is seen from the inside.
Figure 5:
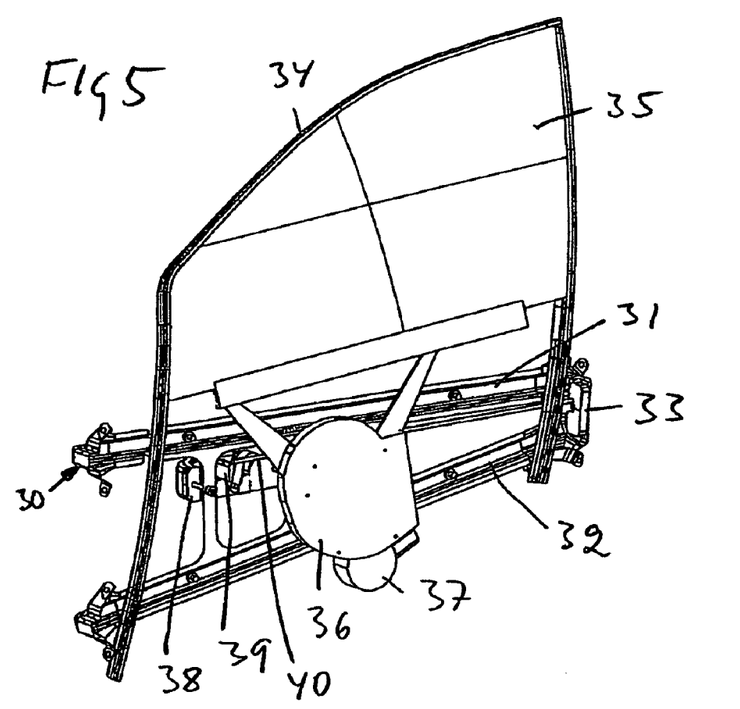
FIG. 5 shows the same structure as FIG. 4 but seen from outside.

FIGS. 4 and 5 show a beam structure 30 formed from a single piece of sheet metal. It has two hat beams 31,32, which at their rear ends carry the lock 33 of the door. The entire window structure including the window frame 34, that also forms guides for the pane 35, and the window lift 36 with its electric motor, is fastened to the beam structure 30 by screws. The armrest 38 carries the door handle 39 that controls the lock through a rod 40. For clarity, the inner panel screwed to the beam structure 30 is not shown. The inner panel 41 is clamped between the beam structure 30 and the arm rest 38. The beam structure 30 can be so designed that it can be made of high strength cold-forming steel, but it can also be made according to the press-hardening method.

Figure 10:
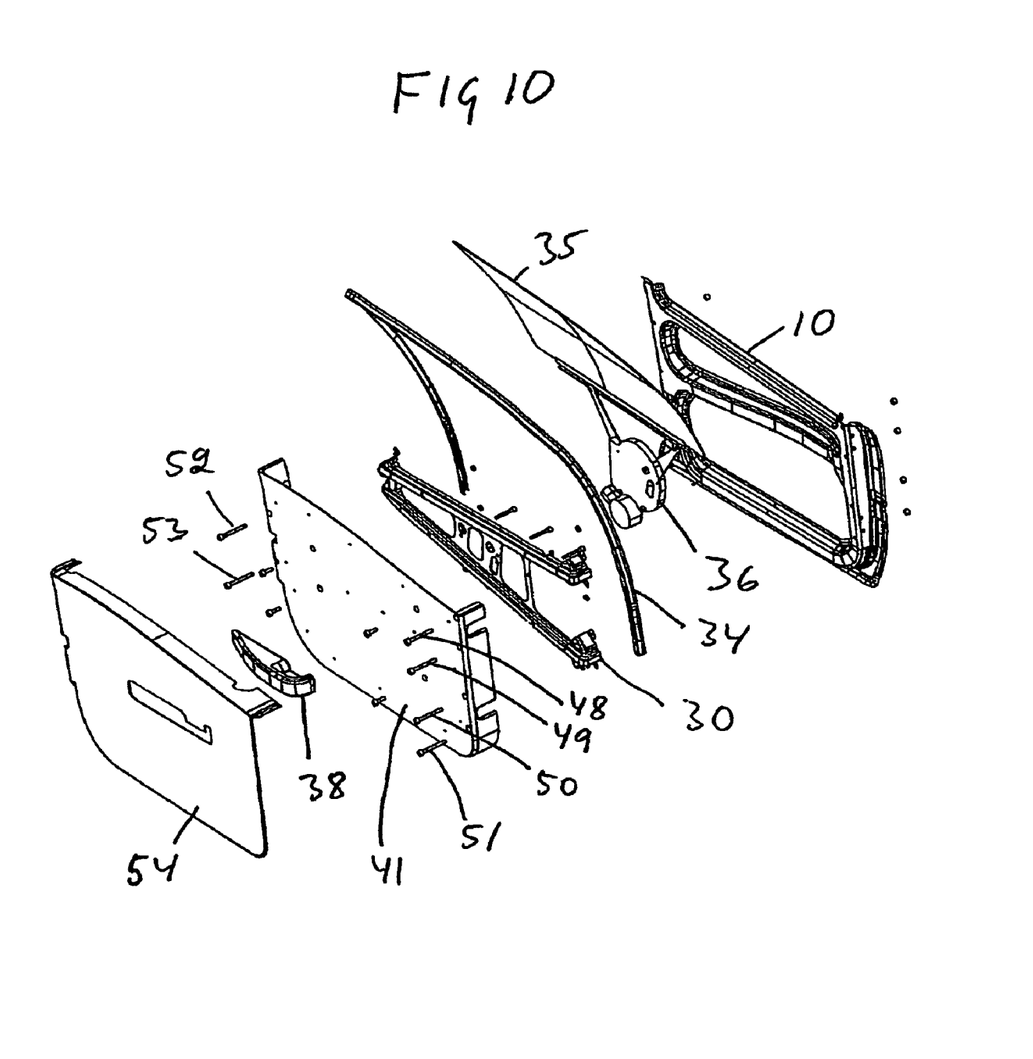
FIG. 10 is an exploded view of the door shown in FIGS. 6–9.

In the exploded view, FIG. 10, the various elements 30–38 are shown as well as the inner panel 41 and they are all screwed together into a unit. The door handle 39 and the rod 40, however, are missing in FIG. 10, but they form part of the unit. This unit 30–41 contains practically all the elements of the door except for the supporting frame 10 and the outer panel joined thereto.

Figure 6:
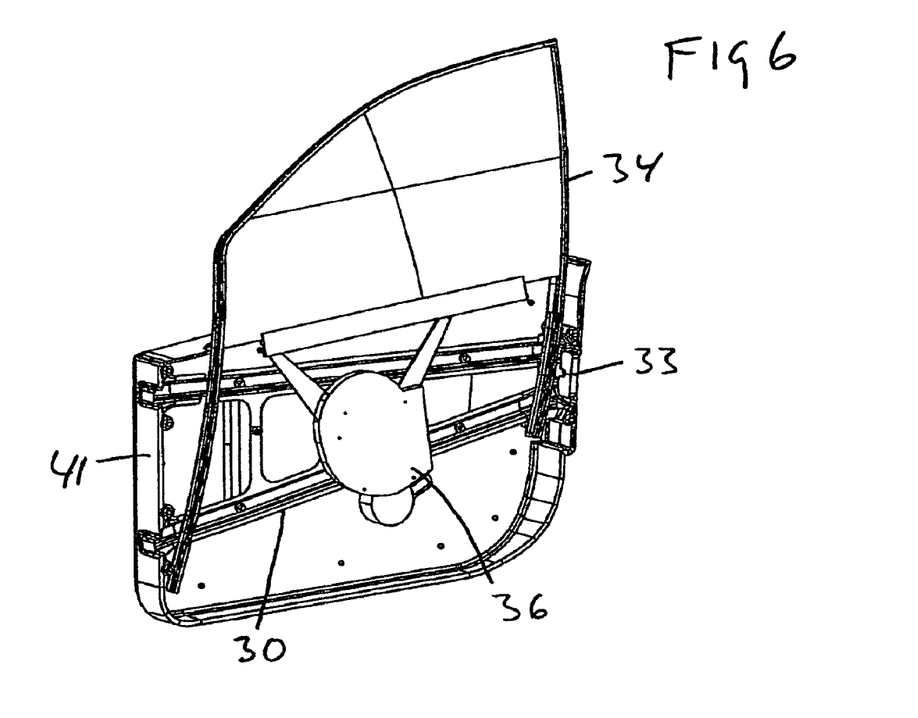
FIG. 6 shows the structure shown in FIGS. 4 and 5 screwed to form a unit with an inner panel.
Figure 7:
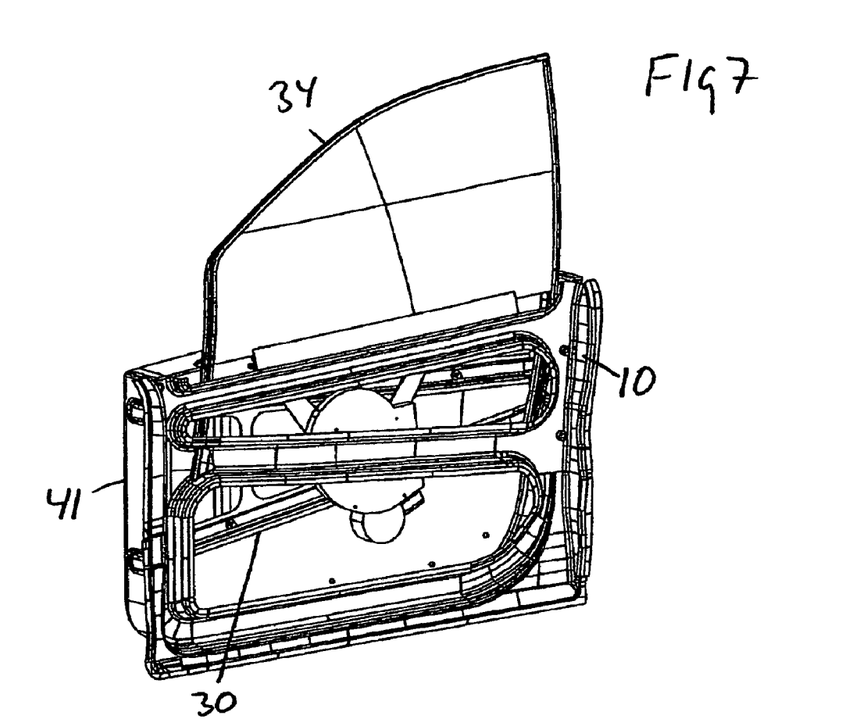
FIG. 7 shows the structure shown in FIG. 6 mounted on the frame shown in FIGS. 1–3.

The unit 30–41 is also shown screwed together as FIG. 6 but the arm rest and the door handle are missing in this figure. FIG. 7 shows the unit of FIG. 6 screwed to the frame 10. The outer panel are fastened to the frame before the mounting of the unit 30–41, but the outer panel is not shown in FIG. 7.

The entire unit 30–41 is fastened to the frame by the ends of the beam structure 30 being fastened by screws 48–53 screwed into nuts welded to the frame 10. The frame 10 is comparatively thin and the inner panel 41 comparatively deep. The inner panel is not supporting and can for example be of plastics. The supporting element of the door, the frame 10 with its side impact guard beam 22, will be close to the outer panel 28, which, as to side impacts, will be advantageous from the safety point of view.

In FIG. 10, a trim 54 is shown which is moved past the arm rest 38 and fastened to the inner panel 41. When necessary for service, the door can easily be opened by the removal of the trim 54 and, after unscrewing the six screws 48–53, the entire unit 30–41 can be removed. All the elements of the door are then in the removed unit. The lock 33 and the door handle 39 with the rod 40 are missing in FIG. 10.

Instead of mounting the inner panel 41 and the beam structure 30 in common in the way illustrated, one may first mount the beam structure and then mount the inner panel on the beam structure. The inner panel can then be fastened by a few smaller screws. It can be press formed or mould to get a finished surface and a separate trim will then not be necessary.

Figure 8:
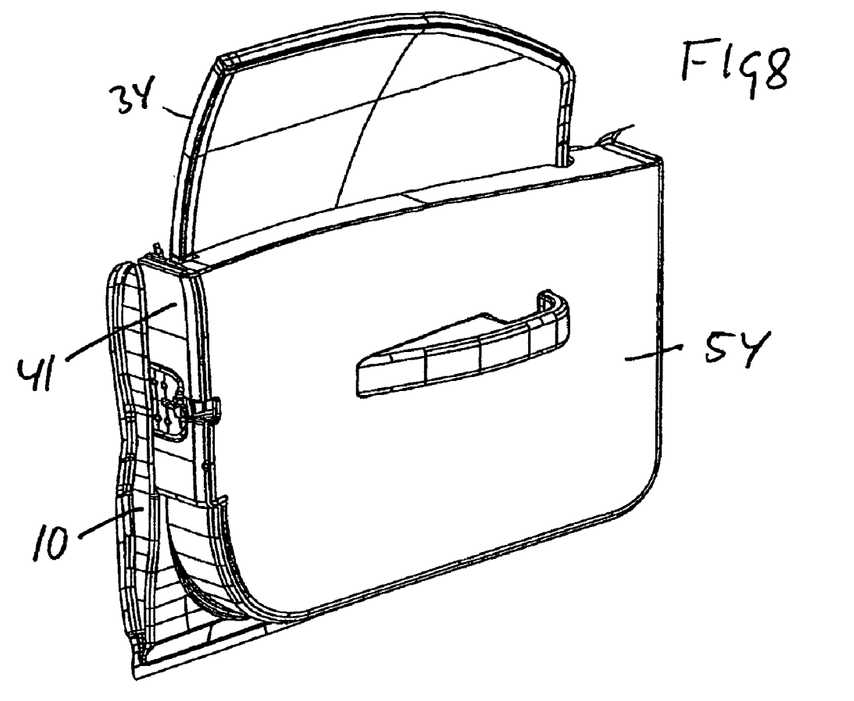
FIG. 8 corresponds to FIG. 7 but shows the door of FIG. 7 seen from inside and obliquely from behind.
Figure 9:
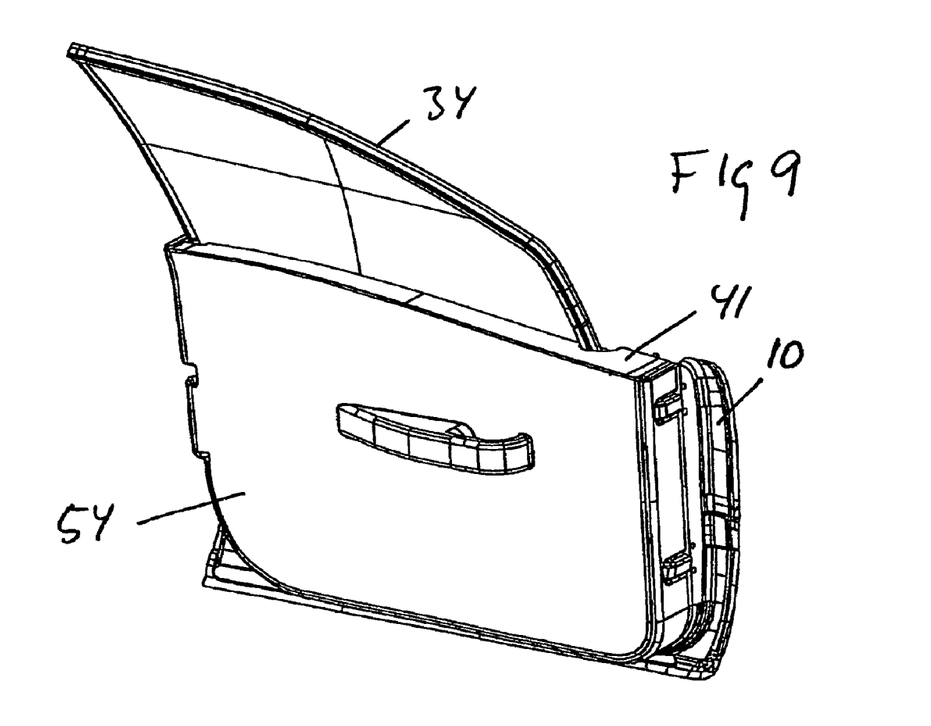
FIG. 9 shows the door in FIG. 8 seen obliquely from front.

FIGS. 8 and 9 show an assembled door with its trim 54 fastened on the inner panel 41. The trim can for example be snapped on. Alternatively, the inner panel can be designed not to need a complete cover but only to need cover on the screws that otherwise would be visible. The inner panel 36 has end sides and a bottom that connect to the hat beam of the frame, and the frame and the inner panel form together the end sides and the bottom of the door. The inner panel has also an upper end that connects to the window 35. Thus, the inner panel seals off the interior of the door and seals off against dust and damp at the same time as it dampens sound.

Figure 11:
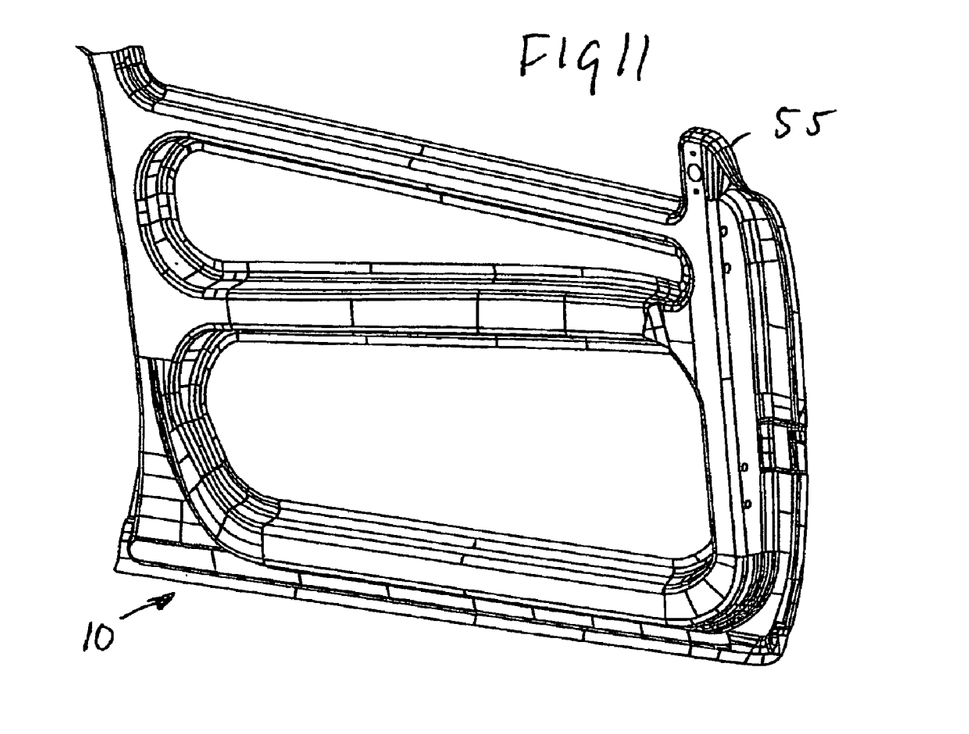
FIG. 11 corresponds to FIG. 1, but shows a somewhat modified design.
Figure 12:
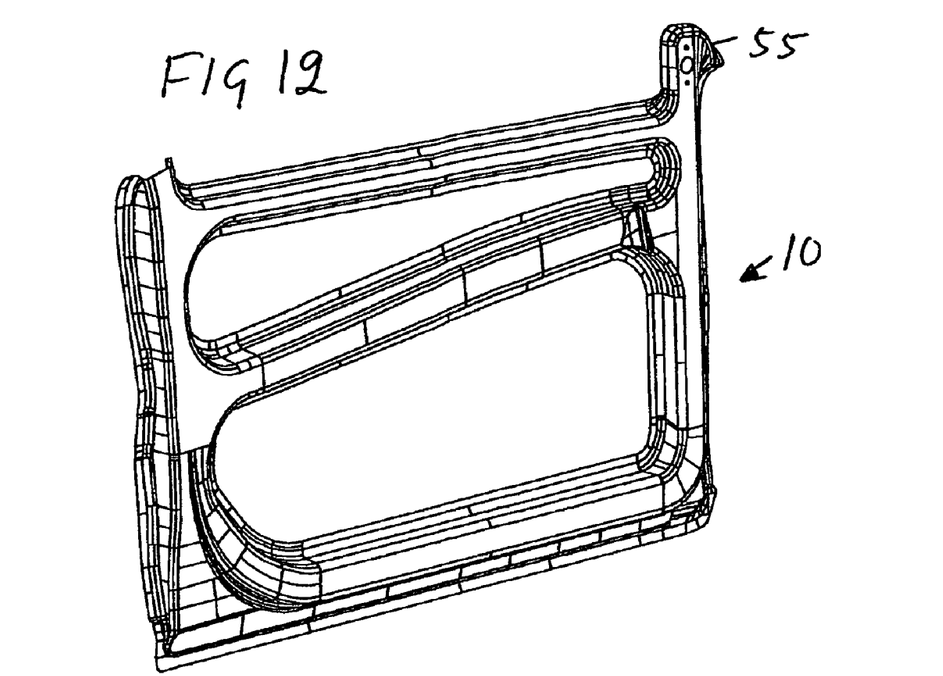
FIG. 12 corresponds to FIG. 2 and shows the design of FIG. 11.

In the preceding figures, the mount for the rear view mirror has not been shown. FIGS. 11 and 12 correspond to FIGS. 1 and 2 and show such a rear view mount 55 that is integrated with the frame 10.

The invention claimed is:

1. A vehicle door, characterised by
    a supporting frame (10) of high strength steel with side impact guard beam (22),
    an outer panel (28) fastened on the frame so that the side impact guard beam will be close to the outer panel,
    a beam structure (30) releasably mounted on the frame, and
    an inner panel (41) fastened on the beam structure,
    the window structure (34–37) of the door being mounted on the releasable beam structure (30) and located between the frame (10) and the beam structure (30).

2. A vehicle door according to claim 1, characterised in that the window structure comprises the window frame (34) of the door.

3. A vehicle door according to claim 1, characterised in that the lock (33) of the door is mounted in the releasable beam structure.

4. A vehicle door according to claim 1, characterised in that the inner panel (41) is made of plastics.

5. A vehicle door according to claim 1, characterised in that a major part of the inner panel (41) is covered by a trim (54).

6. A vehicle door according to claim 5, characterised in that the trim (54) adjoins the window.

7. A vehicle door according to claim 1, characterised in that the thickness of the frame (10) is less than half the thickness of the door.

8. A vehicle door according to claim 1, characterised in that the steel of the frame (10) of the door has a yield strength of at least 800 N/mm$^2$.

9. A method of manufacturing a vehicle door, characterised in that
    a supporting frame (10) of high strength steel including a side impact guard beam (22) is produced, an outer panel (28) is fastened on the frame so that the side impact guard beam will be close to the outer panel, and a beam structure (30) is mounted on the frame (10), a window structure (34–37) being mounted on the beam structure (30) before the mounting of the beam structure so that the window structure will be located between the frame (10) and the beam structure (30) when the beam structure is in place.

10. A method according to claim 9, characterised in that the window structure (34–37) includes the window frame (34) of the door and is mounted on the beam structure (30).

11. A method according to claim 9, characterised in that the lock (33) of the door is mounted on the beam structure before the beam structure is mounted on the frame (10).

12. A method according to claim 9, characterised in that an inner panel (41) is mounted on the beam structure before the beam structure is mounted on the frame (10).

13. A method according to claim 9, characterised in that a blank of sheet steel is formed to form the frame (10) with integrated impact guard beam (22).

14. A method according to claim 9, characterised in that the supporting frame (10) is formed by hot stamping of a hardenable blank and hardended while remaining in the forming tools.

15. A vehicle door according to claim 2, characterised in that the lock (33) of the door is mounted in the releasable beam structure.

16. A vehicle door according to claim 2, characterised in that the thickness of the frame (10) is less than half the thickness of the door.

17. A vehicle door according to claim 2, characterised in that the steel of the frame (10) of the door has a yield strength of at least 800 N/mm$^2$.

18. A method according to claim 10, characterised in that the lock (33) of the door is mounted on the beam structure before the beam structure is mounted on the frame (10).

19. A method according to claim 10, characterised in that an inner panel (41) is mounted on the beam structure before the beam structure is mounted on the frame (10).

20. A method according to claim 10, characterised in that a blank of sheet steel is formed to form the frame (10) with integrated impact guard beam (22).

* * * * *